(12) United States Patent
Jourdan

(10) Patent No.: US 8,245,616 B2
(45) Date of Patent: Aug. 21, 2012

(54) ROTATING BLADE GUIDE ASSEMBLY

(75) Inventor: James K. Jourdan, Fond du Lac, WI (US)

(73) Assignee: Marvel Manufacturing Company, Inc., Oshkosh, WI (US)

( * ) Notice: Subject to any disclaimer, the term of this patent is extended or adjusted under 35 U.S.C. 154(b) by 663 days.

(21) Appl. No.: 12/293,888

(22) PCT Filed: Mar. 24, 2006

(86) PCT No.: PCT/US2006/011066
§ 371 (c)(1),
(2), (4) Date: Sep. 22, 2008

(87) PCT Pub. No.: WO2007/111592
PCT Pub. Date: Oct. 4, 2007

(65) Prior Publication Data
US 2011/0072949 A1 Mar. 31, 2011

(51) Int. Cl.
*B23D 55/08* (2006.01)
*B23D 55/00* (2006.01)
*B26D 1/54* (2006.01)
(52) U.S. Cl. ............... 83/820; 83/824; 30/380
(58) Field of Classification Search .......... 83/120, 83/121, 820, 821, 824; 30/380
See application file for complete search history.

(56) References Cited

U.S. PATENT DOCUMENTS

| | | | | |
|---|---|---|---|---|
| 2,843,917 | A * | 7/1958 | Crane et al. | 83/797 |
| 3,109,465 | A * | 11/1963 | Smith | 83/824 |
| 3,668,961 | A * | 6/1972 | Blue | 30/379 |
| 3,815,465 | A * | 6/1974 | Smierciak | 83/820 |
| 4,327,621 | A * | 5/1982 | Voorhees et al. | 83/820 |
| 4,926,731 | A * | 5/1990 | Kawabata | 83/789 |
| 5,410,934 | A * | 5/1995 | Krippelz | 83/820 |
| 5,987,767 | A * | 11/1999 | Roddie | 33/645 |
| 7,849,604 | B2 * | 12/2010 | McIntosh et al. | 30/380 |

FOREIGN PATENT DOCUMENTS
DE 3808455 * 9/1988

* cited by examiner

*Primary Examiner* — Laura M. Lee
(74) *Attorney, Agent, or Firm* — Joseph S. Heino; Patrick M. Bergin

(57) ABSTRACT

A rotating blade guide assembly for use with a sawing machine includes a blade guide carrier and means for rotating the blade guide carrier from a first position to a second position. The first position would be that blade orientation when the blade is initially placed about a pair of band wheels. The second position would be the blade orientation when the blade is rotated about 90° to a cutting position. In this way, the orientation of the sawing machine blade is changed when the blade guide carrier is rotated from the first position to the second position. The rotating blade guide assembly further provides means for securing the blade guide carrier in the second position so as to prevent rotation of the blade guide carrier during use of the sawing machine.

3 Claims, 8 Drawing Sheets

ROTATING BLADE GUIDE ASSEMBLY

FIELD OF THE INVENTION

This invention relates generally to sawing machines, band saws, including vertical band saws, and to assemblies that are used with such sawing machines and band saws. More specifically, this invention relates to a rotating blade guide assembly that is used to facilitate the mounting of a continuous blade onto the band wheels of a sawing machine and to capture a portion of the blade within the blade guide whereby the operator is then able to rotate a portion of the blade about 90° from its mounting position to a cutting position.

BACKGROUND OF THE INVENTION

Many sawing machines and vertical band saws, in particular, have an endless band-like blade that is mounted about two substantially flat, co-planar band wheels. Typically, the band wheels are situated such that there is an upper band wheel that is positioned above a horizontal work surface and a lower band wheel that is positioned below the horizontal work surface. The blade is then tensioned such that the blade moves with and along a portion of the outer perimeter of the band wheels, the blade having a toothed cutting edge that is used to cut material or stock that is located at the horizontal work surface. This is well known in the art of sawing machines.

In the art of such sawing machines and blades for such machines, it is also known that it is advantageous to rotate a portion of the blade at the horizontal work surface by 90° or so. In this way, there is no limit to the length of material or stock that can be cut by the blade. Without rotation of the blade in this fashion, the material or stock that can be cut is effectively limited in one direction by its length, which would be the distance between that portion of the cutting blade that is traveling in one direction and that portion of the cutting blade that is traveling in the opposite direction. Generally, this distance is the diameter of one or the other of the band wheels that are used in the saw. Rotation of the blade by 90° at the working surface eliminates this limitation. Rotation is typically effected by means of stationary guide means located above and below the horizontal work surface.

In sawing machines of this type, it is also necessary to replace the band-like blade, or band, with another from time to time. This is accomplished by releasing the tension between the upper and the lower band wheels, then removing that portion of the band from within the stationary guide means and finally removing the band from the machine. To install a new band, the operator must position a portion of the band above the upper band wheel and along its perimeter, position another portion of the band below the lower band wheel and about its perimeter, and then, by hand, twist a portion of the band at the horizontal working surface about 90° in order to place that portion of the band into the stationary guide mechanism. The guide mechanism typically consists of two guide assemblies, one above the working surface and one below, each having a slot within which the band is inserted. Typically, the blade guide assemblies will include carbide guides that are used to support the sides of the blade and a carbide-faced pressure block that is used to support the back edge of the blade. In this fashion, the guide assemblies apply a slight, forward pre-load to the band blade which effectively reduces noise and vibration during cutting. Once the band is in place, the band is properly tensioned and the sawing machine is ready for cutting.

In the view of this inventor, what is needed is an assembly that provides a blade guide that is rotatable such that the band can be placed about the band wheels and then, with the band in that position, the band can also be placed into the blade guide. The blade guide, with the band placed within it, can then be simply rotated by hand such that the desired cutting position of the blade is accomplished, as described above. What is also needed is a way to effectively secure the rotated blade guide in its rotated position for proper cutting. What is also needed is a way to provide two such rotating blade guide assemblies such that one can be located above the working surface and one below it. What is also needed is such a blade guide assembly that also tensions the band during normal use by using any variety of tensioning means of current manufacture that can be built into, or used with, the rotating blade guide assembly of the present invention.

SUMMARY OF THE INVENTION

The present invention provides for a rotating blade guide assembly that includes a blade guide carrier and means for rotating the blade guide carrier from a first position to a second position. The first position would be that blade orientation when the blade is initially placed about the band wheels. The second position would be the blade orientation when the blade is rotated about 90° to its cutting position. In this way, the orientation of the sawing machine blade is changed when the blade guide carrier is rotated from the first position to the second position, thus avoiding the need to do so by hand. The rotating blade guide assembly of the present invention further provides means for securing the blade guide carrier in the second position so as to prevent rotation of the blade guide carrier during use of the sawing machine.

The foregoing and other features of the rotating blade guide assembly of the present invention will be apparent from the detailed description that follows.

DETAILED DESCRIPTION

Figure 1:
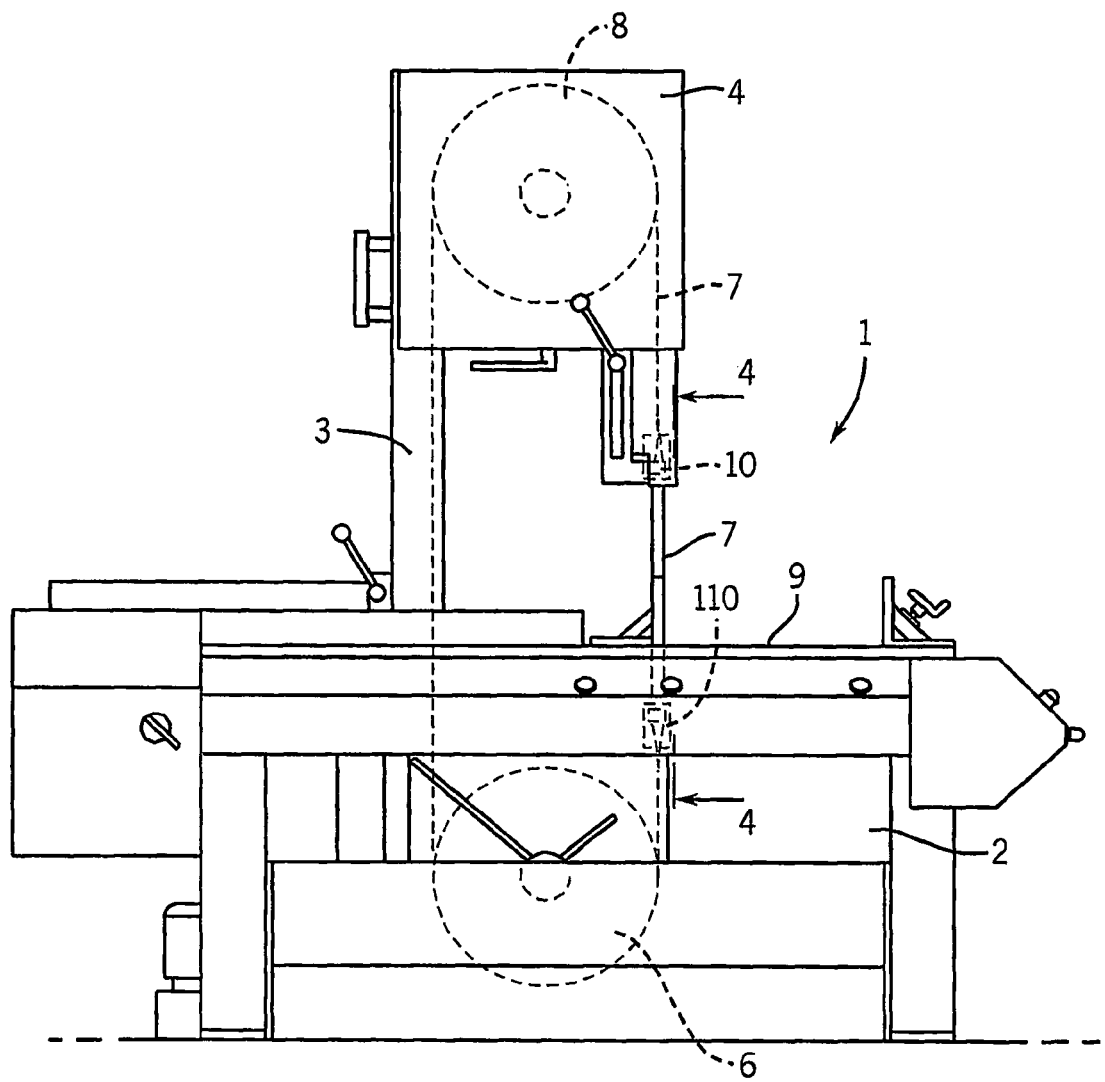
FIG. 1 is a left side elevational view of a sawing machine that utilizes a pair of rotating blade guide assemblies, each of which is constructed in accordance with the present invention.

Referring now to the drawings in detail, wherein like numbers represent like elements throughout, FIG. 1 illustrates a sawing machine 1 that utilizes a pair of rotating blade guide assemblies, generally identified 10 and 110, of the type that are constructed in accordance with the present invention. For the sole purpose of describing a preferred embodiment of the present invention, it is to be understood that the present invention is not limited to a specific sawing machine, the sawing machine 1 here being in the form of a vertical band saw. The sawing machine 1 has a base member 2, the base member 2 including a working surface 9. Extending upwardly from the work surface 9 of the base member 2 is a blade-carrying column or support member 3. The support member 3 is used to cantilever an upper blade guide assembly 4 above the work surface 9 of the base member 2 and to carry a portion of an endless, or continuous, band-like blade 7 within it. Within the upper blade guide assembly 4 is an upper band wheel 8. The upper band wheel 8 cooperates with a lower band wheel 6 that is situated within the base member 2 to form a oval-shaped band path about which the blade 7 is carried.

As shown in FIG. 1, the sawing machine 1 further includes an upper guide rotation assembly 10 that is configured as part of the upper blade guide assembly 4. The sawing machine 1 also includes a lower guide rotation assembly 110, which is part of the base member 2. While each of the upper and lower guide rotation assemblies 10, 110 are intended to functionally cooperate with each other, it is to be understood that each is separately movable in the preferred embodiment as will be explained in more detail later in this detailed description.

Figure 2:
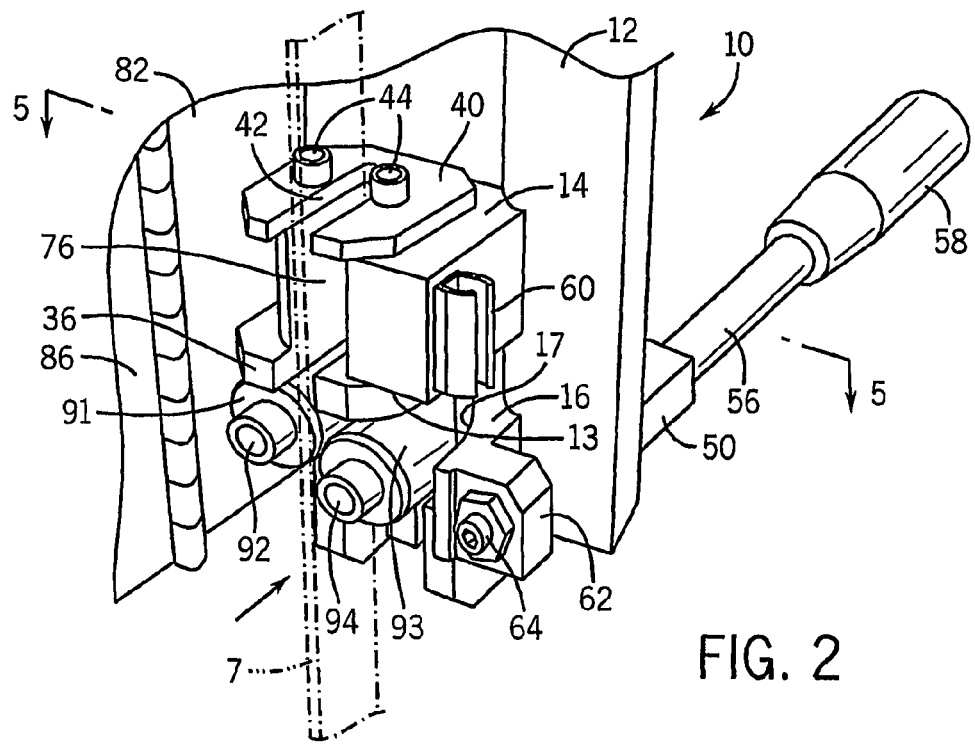
FIG. 2 is an enlarged top, rear and right side perspective view of the upper rotating blade guide assembly that is used in the sawing machine illustrated in FIG. 1.

Referring now to FIG. 2, it illustrates a perspective view of a preferred embodiment of an upper guide rotation assembly 10 that is constructed in accordance with the present invention. FIG. 2 also illustrates a guide arm 12 that extends downwardly from the upper blade assembly 4 of the sawing machine 1. The upper guide rotation assembly 10 is attached to the bottom-most portion of this guide arm 12. The upper guide rotation assembly 10 includes a blade guide carrier 30 that is effectively "captured" within a portion of the guide arm 12 and includes several essential features.

Figure 11:
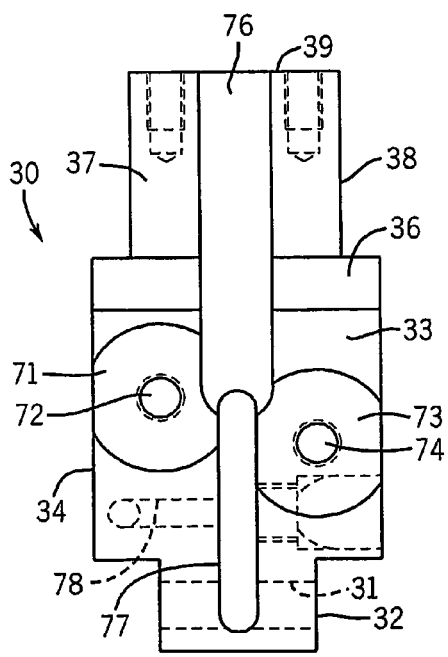
FIG. 11 is a front elevational view of the blade guide carrier of the rotating blade guide assembly of the present invention.
Figure 12:
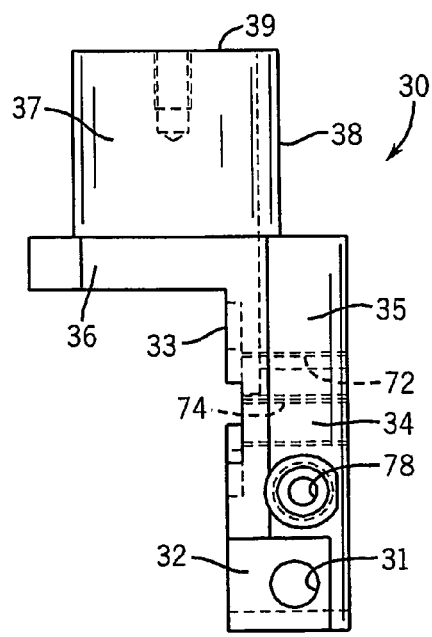
FIG. 12 is a right side elevational view of the blade guide carrier illustrated in FIG. 11.

Referring specifically to FIGS. 11 and 12, it will be seen that the blade guide carrier 30 is a unitary structure that includes a bottom portion 32, a central portion 34 and an upper portion 38. It should be noted, however, that the blade guide carrier 30 is not limited to a unitary construction, the equivalent structure being obtainable by a number of individual structures assembled to effect the same functionality. The blade guide carrier 30 also is not limited to the specific blade guide arrangement disclosed in this detailed description. Other blade guide carrier 30 configurations and blade guide arrangements could be used without deviating from the scope of the present invention.

In the embodiment disclosed and illustrated herein, it will be seen that the bottom portion 32 of the blade guide carrier 30 includes an aperture 31 and a front face 33. The front face 33 extends upwardly in a plane along the central portion 34 of the blade guide carrier 30 as well. Opposite the front face 33 of the central portion 34, and to the rear thereof, is a substantially cylindrically-shaped outer arcuate surface 35. At the uppermost portion of the front face 33, and extending forwardly of the front fact 33 of the central portion 34 of the blade guide carrier 30, is a pair of shoulder members 36. The shoulder members 36 are separated by a slot 76. The upper portion 38 of the blade guide carrier 30 also includes a substantially cylindrically-shaped outer arcuate surface 37 and a flat top portion 39. The slot 76 between the shoulder portions 36 extends upwardly through the upper portion 38 of the blade guide carrier 30. The front face 33 of the blade guide carrier 30 further includes a first counter-bore 71, the first counter-bore 71 being a generally circular structure and having an axially-aligned aperture 72. The front face 33 also includes a second counter-bore 73 and an aperture 74. The function and purpose of both counter-bores 71, 73 and apertures 72, 74 will be apparent later in this detailed description. In this embodiment, the blade guide carrier 30 includes another vertically-disposed slot 77, the purpose of which is to carry a pressure block (not shown) against a blade 7 situated within the assembly 10. The pressure block would be movable by means of an eccentric fastener 79 (see FIG. 7) that would be inserted into and be rotatable within an aperture 78 also disposed within the blade guide carrier 30.

Referring back to FIGS. 2 and 3, it will be seen that the blade guide carrier 30 is effectively "captured" by or retained within the guide arm 12. More specifically, it will be seen that the guide arm 12 includes a first forwardly-extending guide arm member 14. Disposed below it is a second forwardly-extending guide arm member 16. The first forwardly-extending member 14 of the guide arm 12 includes a forwardly-facing arcuate surface 15, the cylindrical contour of the arcuate surface 15 substantially matching the arcuate surface 37 of the upper portion 38 of the blade guide carrier 30. See FIGS. 5 and 6. Similarly, the second forwardly-extending guide aim member 16 of the guide arm 12 includes a forwardly-facing arcuate surface 17 as well, this arcuate surface 17 having a cylindrical contour and being similarly dimensioned as that of the rear arcuate surface 35 of the central portion 34 of the blade guide carrier 30. See FIG. 3. In this fashion, the blade guide carrier 30 is allowed to be captured within and is rotatable within the forwardly-extending guide arm members 14, 16 of the guide arm 12.

Figure 3:
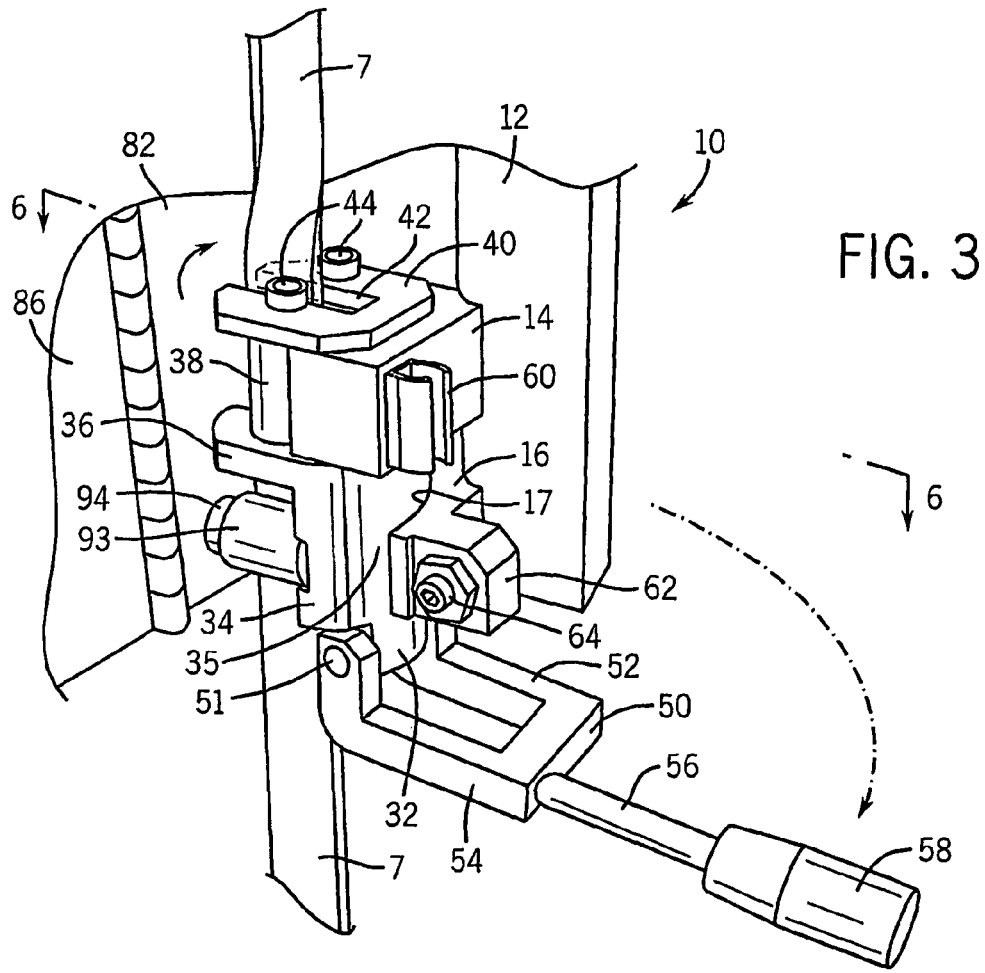
FIG. 3 is the same view of the upper guide rotation assembly illustrated in FIG. 2, but showing a portion of the assembly rotated 90°.

The first forwardly-extending guide arm member 14 further includes a bottom flat surface 13 that is intended to rest against the shoulders 36 of the blade guide carrier 30. Disposed at the top surface 39 of the blade guide carrier 30 is a cap 40. The cap 40 includes a centrally-disposed slot 42 and is secured or attached to the upper portion 38 of the blade guide carrier 30 by means of fasteners 44. The slot 42 of the cap 40 substantially matches the dimensioning of the slot 76 that is defined within the blade guide carrier 30. When used as intended, a portion of the band saw blade 7 passes through the slot 42 of the cap 40 and also through the slot 76 of the blade guide carrier 30. In this regard, and when comparing FIGS. 2 and 3 to one another, it will be seen that the saw blade 7 is "twisted" 90°. As shown in FIG. 3 (and in FIG. 7), this "twisting" is greatly exaggerated to be shown to occur in a relatively short portion of the blade 7. This is for purposes of demonstrating a preferred embodiment of the invention. In reality, the twisting of the blade 7 would occur over a significantly greater length of the blade 7.

Referring again to FIG. 3, it will be seen that the bottom portion 32 of the blade guide carrier 30 has a fork 50 attached to it. The fork 50 includes a pair of like-configured fork extension members 52, 54 which are attachable to opposing sides of the bottom portion 32 of the blade guide carrier 30. Attachment is accomplished by means of a pivot pin 51 that is retained within the fork members 52, 54 and the aperture 31 of the blade guide carrier bottom portion 32. Extending upwardly from the fork 50 is shaft 56 and a handle 58. A portion of the shaft 56 is receivable within a spring clip 60 that is attached to the first forwardly-extending guide arm member 14 of the guide arm 12. The fork 50 allows the operator to apply torque to the blade guide carrier 30 to effect rotation of the carrier 30 within the upper guide rotation assembly 10 when the assembly 10 is used as intended. The spring clip 60 allows the handle 58 to be secured when the assembly 10 is in position where the blade 7 can be used to cut stock. The fork members 52, 54 effectively "straddle" an extension member 62 having a drive screw 64 which is provided to allow for fine adjustment of the guide rotation assembly 10 as may be desired or required.

The upper guide rotation assembly 10 also includes a pair of blade guides 91, 93 that are attached to the central portion 34 of the blade guide carrier 30 by means of guide posts 92, 94 respectively. It should be noted that the blade guides 91, 93 are functionally adapted to be held within the counter-bores 71, 73 that are defined within the central portion 34 of the blade guide carrier 30. It should also be noted that the guide posts 92, 94 are receivable within the apertures 72, 74 also defined within the central portion 34 of the blade guide carrier 30 to retain the blade guides 91, 93 respectively, within the counter-bores 71, 73, respectively. It should also be noted that the aperture 72 to one side of the central portion 34 of the blade guide carrier 30 is located somewhat higher than its counterpart aperture 74 to the other side of the central portion 34 of the blade guide carrier 30. The purpose and functionality of this arrangement will be apparent later in this detailed description. However, it is again to be noted that the positioning and use of the particular blade guides 91, 93 described is for purposes of explanation only, the invention not being limited to the specific blade guide arrangement described herein. Other blade guide arrangements could be used without deviating from the scope of the present invention.

Figure 5:
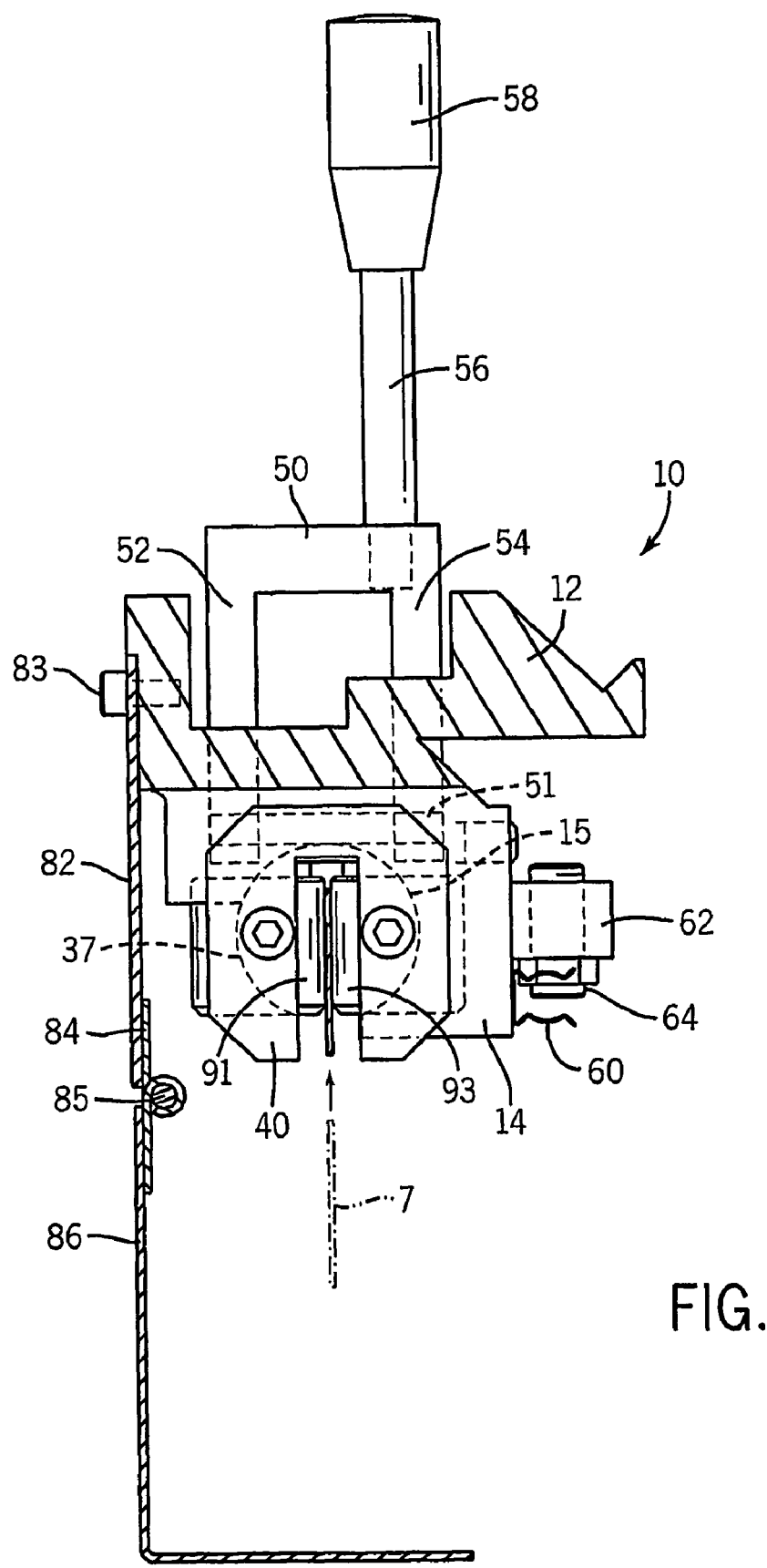
FIG. 5 is a partially sectioned top plan view of the upper guide rotation assembly illustrated in FIG. 2 and taken along line 5-5 of FIG. 2.
Figure 6:
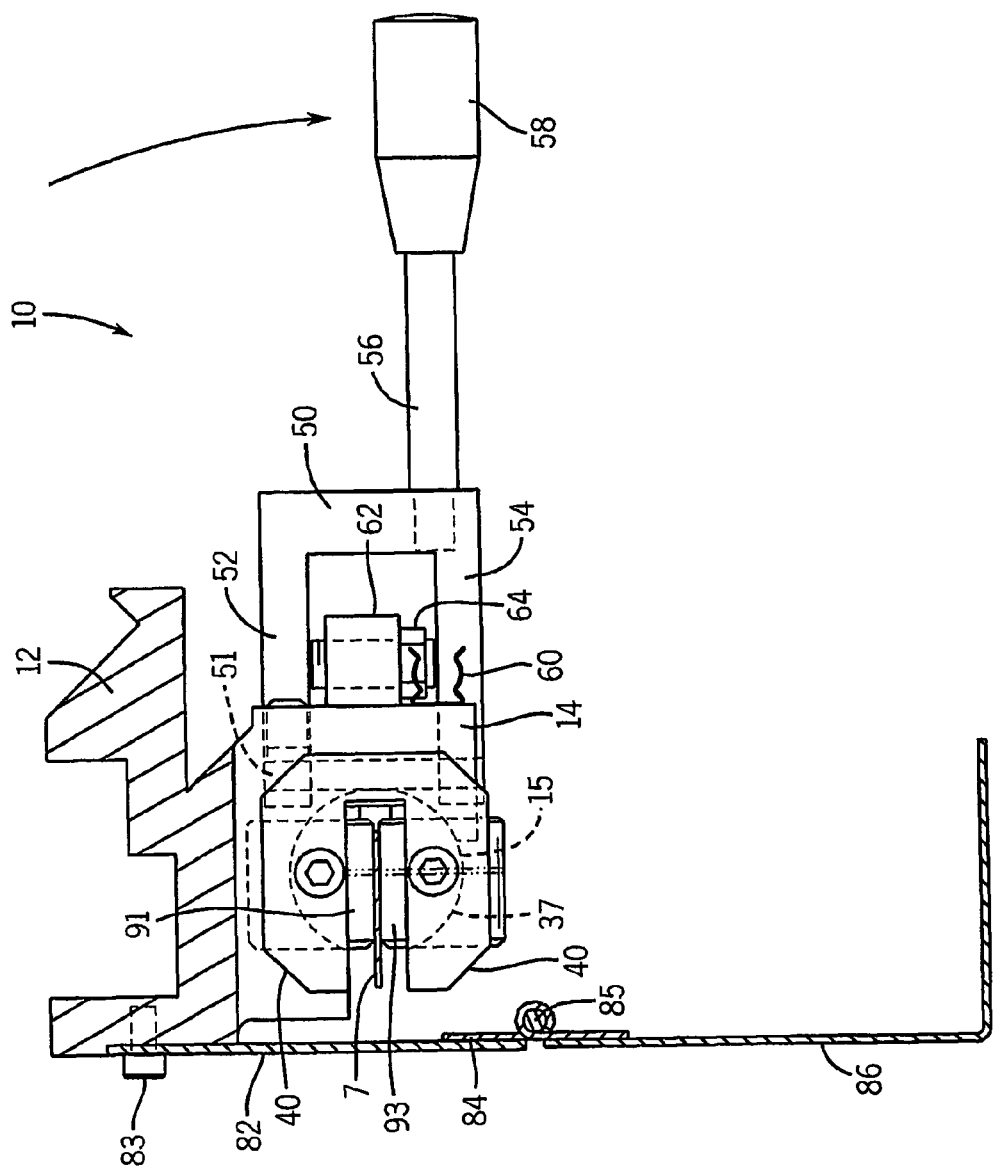
FIG. 6 is a partially sectioned top plan view of the upper guide rotation assembly illustrated in FIG. 3 and taken along line 6-6 of FIG. 3.
Figure 8:
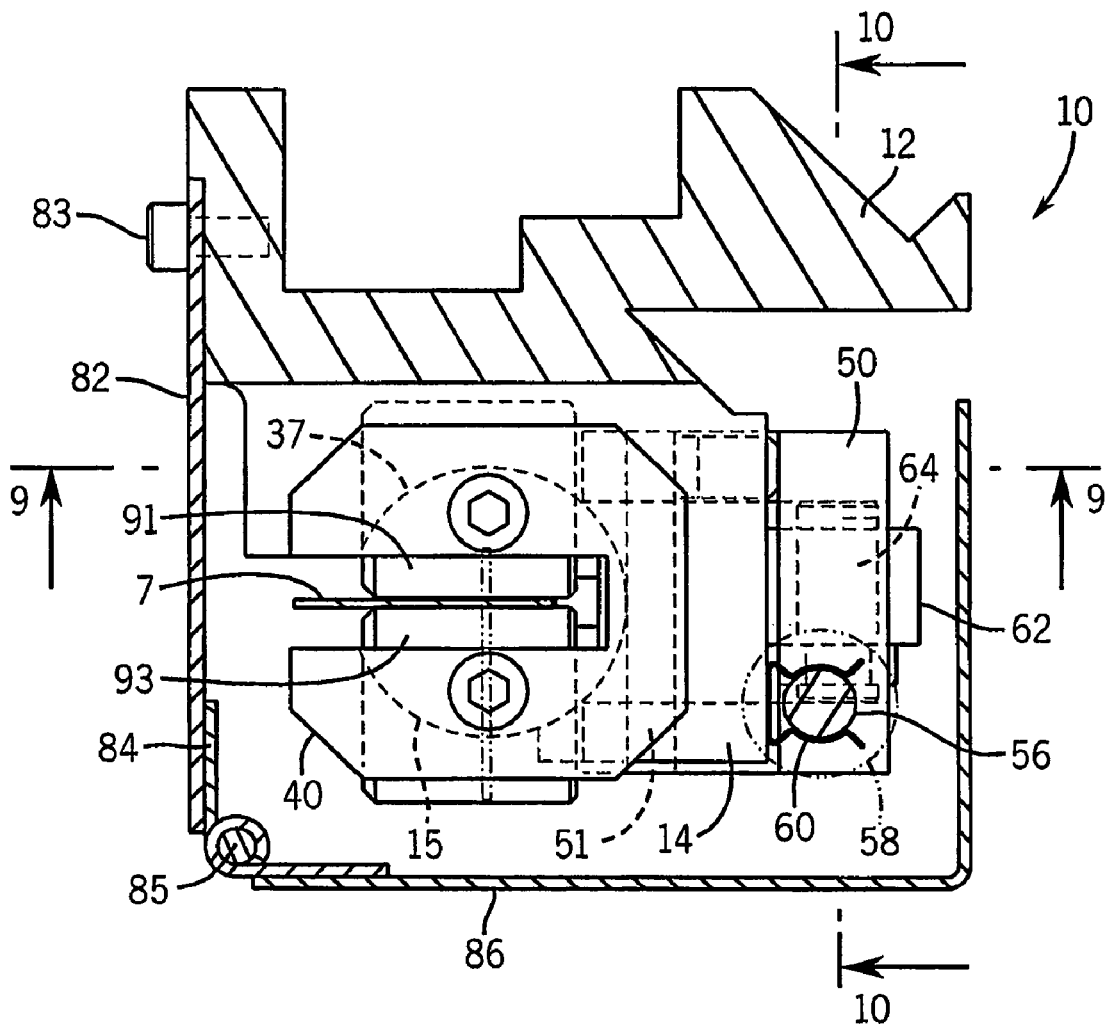
FIG. 8 is a further enlarged cross-sectioned top plan view of the upper guide rotation assembly of the present invention.
Figure 10:
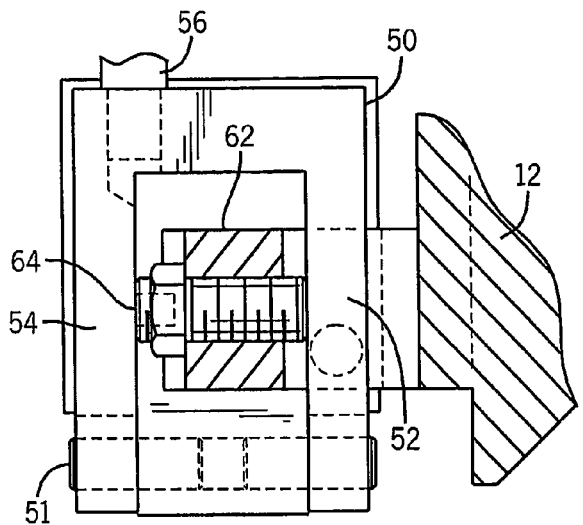
FIG. 10 is a further enlarged and partially cross-sectioned top plan view taken along line 10-10 of FIG. 8.
Figure 9:
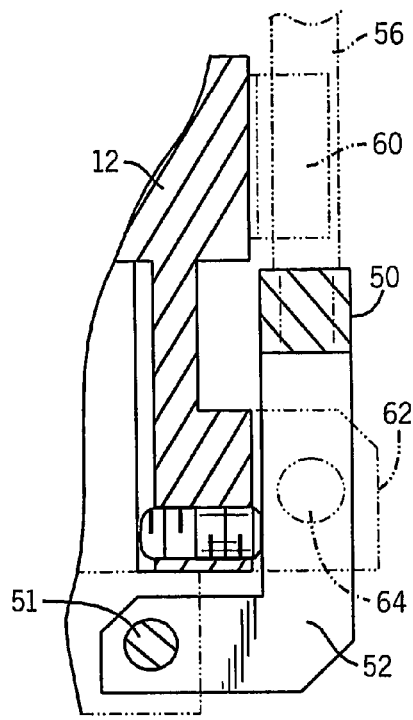
FIG. 9 is a further enlarged and partially cross-sectioned right side elevational view taken along line 9-9 of FIG. 8.

Referring now to FIGS. 5, 6 and 8, in addition to FIGS. 2 and 3, it will be seen that the upper guide rotation assembly 10 also includes a side guard 82 that is attached to the guide arm 12 by means of one or more fasteners 83. The side guard 82 is a flat, plate-like member that is intended to keep the moving parts of the upper guide rotation assembly 10 from being accessible by an operator of the sawing machine 1 during normal cutting operations. The upper guide rotation assembly 10 also includes a front guard 86 which is a similar plate-like member that is L-shaped in vertical configuration. The front guard 86 is rotatably attached to the side guard 82 by means of a hinge 84 and a hinge pin 85. See FIGS. 5 and 6. This structure is also greatly variable and such variations are within the scope of the present invention.

Figure 4:
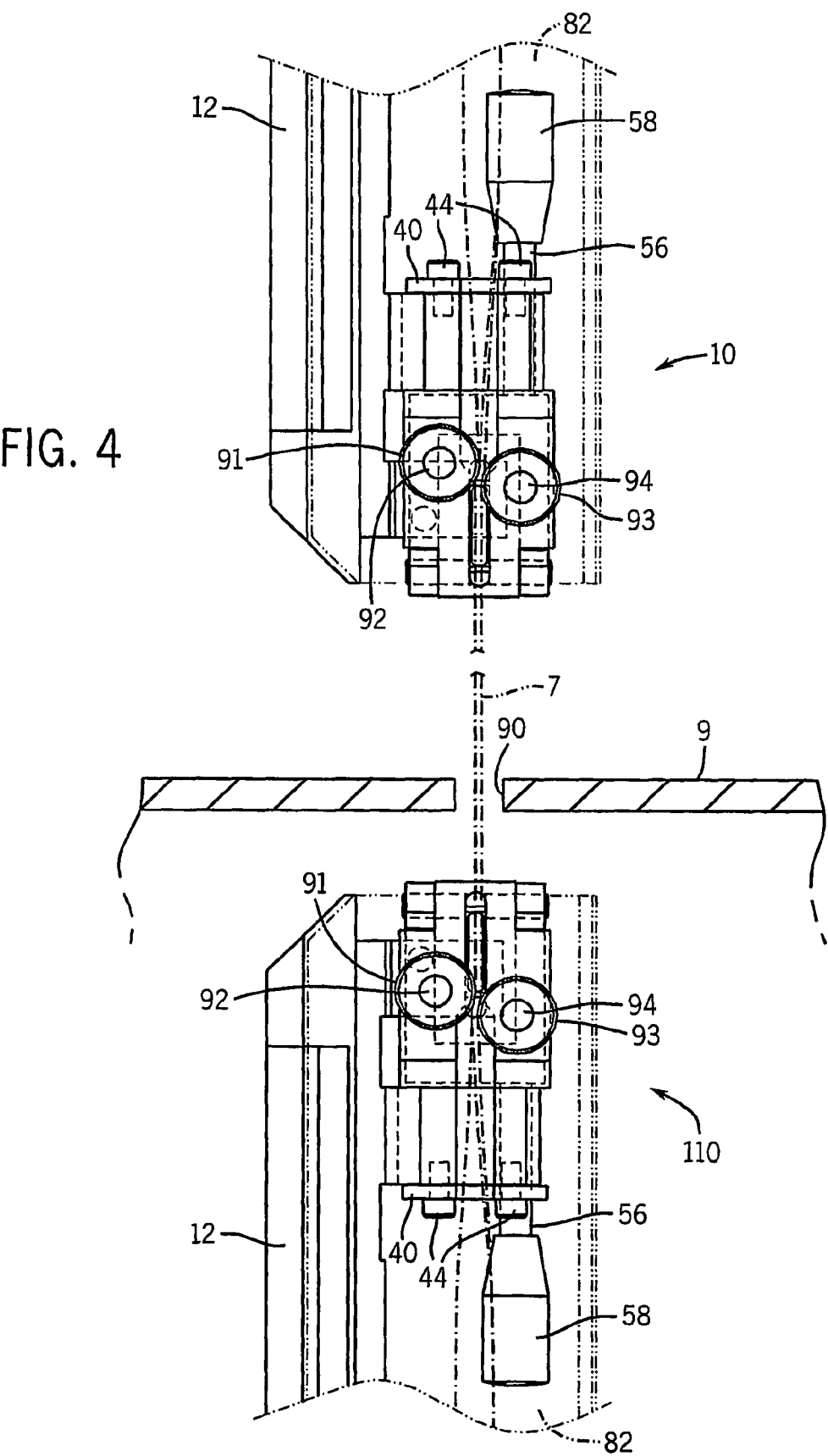
FIG. 4 is front elevational view illustrating an upper guide rotation assembly and a lower guide rotation assembly used in the sawing machine illustrated in FIG. 1 and taken along line 4-4 of FIG. 1.

It is to be understood that the lower guide rotation assembly 110, as is illustrated in FIGS. 1 and 4, would contain essentially the same elements as those described above for the upper guide rotation assembly 10. That is, it is to be understood by those skilled in the art that the blade guide rotation assemblies 10, 110 disclosed in accordance with the detailed description herein are preferably like-configured and would function in essentially the same, if not identical, fashion.

In application, it will be assumed that the operator needs to install a new blade 7 into the sawing machine 1. It will also be assumed that the upper guide rotation assembly 10 has been left in the position it would normally be in following removal of the blade 7 that was last used in the sawing machine 1. That position would be as is illustrated in FIGS. 2 and 5. With the upper guide rotation assembly 10 in that position, and the lower guide rotation assembly 110 in the same position, the operator would place the blade 7 around the peripheral edge of the lower wheel 6 and around the peripheral edge of the upper wheel 8. The operator would then place a portion of the blade 7 within the slot 42 of the cap 40, within the slot 76 of the blade guide carrier 30, and between the blade guides 91, 93. During this placement of the blade 7, the handle 56, 58 and fork 50 are in a generally horizontal position.

Figure 7:
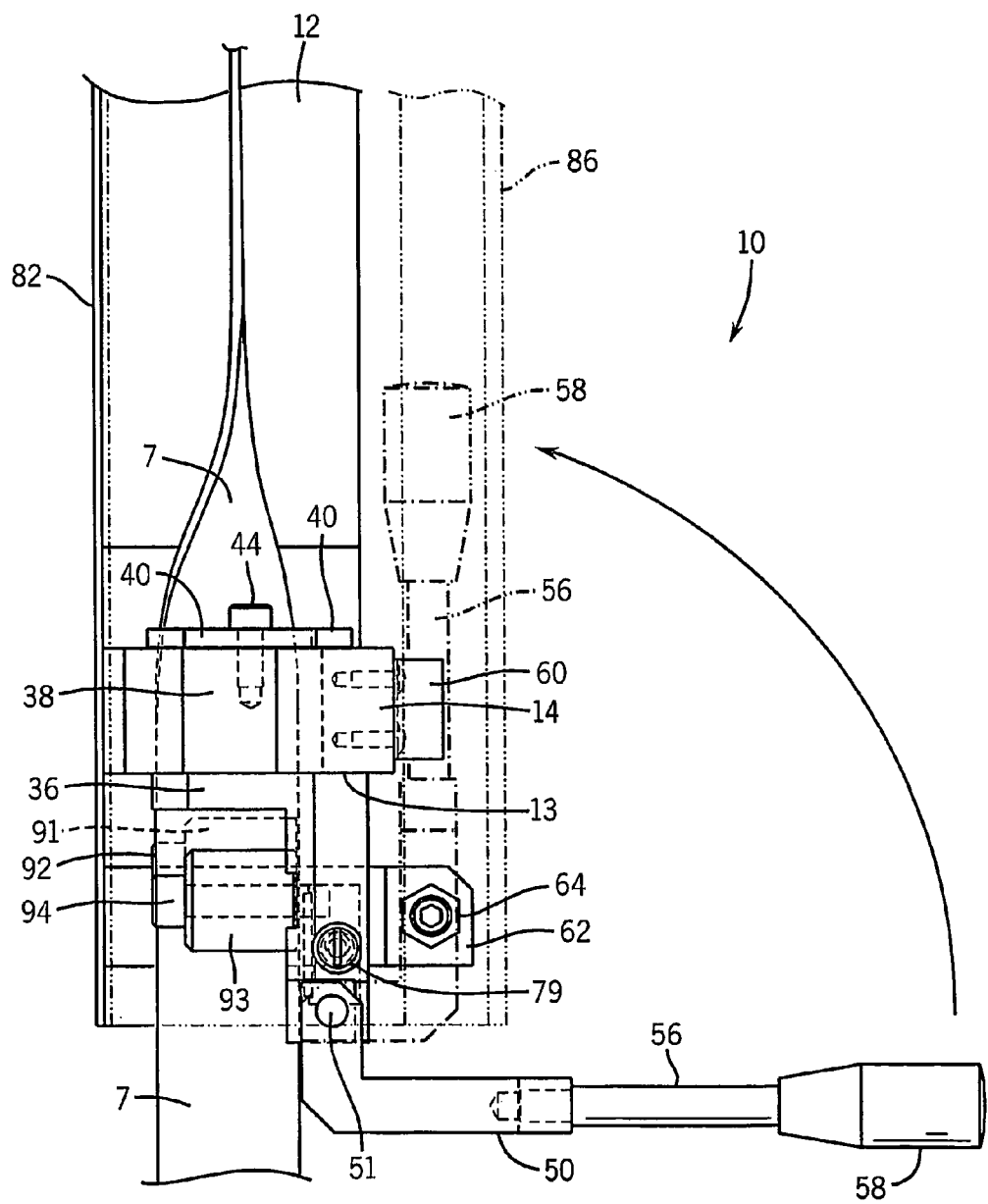
FIG. 7 is a further enlarged right side elevational view of the upper guide rotation assembly illustrated in FIGS. 3 and 6.

With the blade 7 inserted as described above, the handle 56, 58 and fork 50 are rotated to the position shown in FIGS. 3, 6 and 7. This rotation also serves to rotate the blade guide carrier 30 within the outwardly extending members 14, 16 of the guide arm 12, thereby twisting the blade 7 about 90°. With this movement, the arcuate surface 37 of the upper portion 38 of the blade guide carrier 30 slidingly moves across the arcuate surface 15 of the first forwardly-extending guide arm member 14 and the arcuate surface 35 of the central portion 34 of the blade guide carrier 30 slidingly moves across the arcuate surface 17 of the second forwardly-extending guide arm member 16. With the blade 7 and the guide carrier 30 in this position, the fork 50 is rotated upwardly to a vertical position as shown in FIGS. 7 and 8. In this position, the shaft 56 of the handle 58 is captured within the spring clip 60. In this position, the fork members 52, 54 straddle the extension member 62 and drive screw 64, imparting some frictional resistance on the fork 50 and keeping in position which, in turn, keeps the blade guide carrier 30 from rotating. Finally, as is shown in FIG. 8, the front guard 86 can be swung into position to keep the operator away from the assembly 10. It is to be understood that the lower rotating blade guide assembly 110 would operate in the same fashion and the two assemblies 10, 110 would functionally cooperate to accomplish the intended function. Finally, and after tensioning of the band 7 is completed, the sawing machine 1 can be activated. During operation, the blade guide assemblies 10, 110 will each include carbide guides 91, 93 that are used to support the sides of the blade 7 and a carbide-faced pressure block (not shown) that is used to support the back edge of the blade 7. In this way, the guide assemblies 10, 110 apply a slight, forward pre-load to the band blade 7 which effectively reduces noise and vibration of the blade 7 during cutting as the blade 7 moves through the slot 90 defined within the working surface 9. See FIG. 4.

Although a preferred embodiment of the invention has been disclosed above, it will be understood that modifications may be made within the spirit and scope of the invention. Accordingly, it is intended that the invention no be limited by the foregoing description but solely by the scope of the appended claims.

What is claimed is:

1. A band saw machine comprising:
   a support column, an upper band wheel, and a lower band wheel;
   an endless band saw blade mounted on the upper band wheel and the lower band wheel;
   a guide arm comprising at least one support member extending from the guide arm, the at least one support member comprising an extension member having a threaded aperture therethrough;
   a blade guide carrier comprising a longitudinally-extending member having a bottom portion, the blade guide carrier providing a slot structure with an open end for accommodating the endless band saw blade between at least two opposing blade guide members, the blade guide carrier comprising at least one arcuate surface that is configured to rotatably mate with an arcuate surface of the at least one support member;
   a fork member comprising a pair of fork extension members, each fork extension member having an inner surface, the fork member being attached to the bottom portion of the blade guide carrier, the fork member being operable to rotate the blade guide carrier and the endless band saw blade relative to the guide arm from a first blade installation position to a second locked position in which the fork member is operable to be rotated upwardly such that the fork extension members straddle the extension member to selectively prevent rotation of the blade guide carrier within the at least one support member and wherein the endless saw blade is removeable from the open end of the slot structure in the blade guide carrier throughout the blade carrier's range of rotation between the first installation position and the second operational position; and a drive screw in the threaded aperture of the support member extension member, the drive screw being adjustable within the threaded aperture to protrude from either side of the extension member to contact the inner surfaces of the fork extension members to provide accurate rotational adjustment of the blade guide carrier and the endless band saw blade relative to the guide arm when the fork member is rotated upwardly into said second locked position.

2. The rotating blade guide assembly of claim 1 wherein the fork member allows for rotation of the blade guide carrier and the blade by approximately 90°.

3. A band saw machine comprising;

a support column, an upper band wheel, and a lower band wheel;

an endless band saw blade mounted on the upper band wheel and the lower band wheel;

a guide arm comprising at least one support member extending from the guide arm, the at least one support member comprising an extension member having a threaded aperture therethrough;

a blade guide carrier mounted to the at least one support member so as to permit the blade guide carrier a range of motion within the at least one support member, the blade carrier comprising a longitudinally-extending member having a bottom portion, the blade guide carrier providing a slot structure for retaining the endless band saw blade, the slot structure being accessible throughout the range of rotation of the blade guide carrier;

a fork member comprising a pair of fork extension members, each fork extension member having an inner surface, and the fork member being pivotally attached to the bottom portion of the blade guide carrier and further comprising a handle extending outwardly from the fork extension members, the fork member further being operable to rotate the blade guide carrier and the endless band saw blade relative to the guide arm from a first position to a second locked position, the fork member being securable in said second locked position in which the fork extension members straddle the extension member of the at least one support member to selectively prevent rotation of the blade guide carrier within the at least one support member; and a drive screw;

in the threaded aperture, the drive screw being adjustable within the threaded aperture to protrude from either side of the extension member to contact the inner surfaces of the fork extension members to provide rotational adjustment of the blade guide carrier and the endless band saw blade relative to the guide arm when the fork member is rotated upwardly into said second locked position.

* * * * *